US007392941B2

(12) United States Patent
Choi

(10) Patent No.: US 7,392,941 B2
(45) Date of Patent: Jul. 1, 2008

(54) SECURITY MONITOR APPARATUS AND METHOD USING SMART CARD

(75) Inventor: Young-hun Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/670,772

(22) Filed: Sep. 26, 2003

(65) Prior Publication Data

US 2004/0129776 A1    Jul. 8, 2004

(30) Foreign Application Priority Data

Sep. 26, 2002  (KR) .................... 10-2002-0058463

(51) Int. Cl.
*G06K 5/00*    (2006.01)
*G06K 19/06*   (2006.01)

(52) U.S. Cl. .................. 235/382; 235/380; 235/492

(58) Field of Classification Search ............ 235/380, 235/382, 382.5, 493, 492, 435, 379, 487, 235/375, 441
See application file for complete search history.

(56) References Cited

U.S. PATENT DOCUMENTS

| | | | | |
|---|---|---|---|---|
| 3,596,249 A * | 7/1971 | Tierney ..................... 235/380 |
| 3,947,666 A * | 3/1976 | Carlson ..................... 235/454 |
| 4,423,313 A * | 12/1983 | Tanigaki ..................... 235/379 |
| 4,423,318 A * | 12/1983 | Gotou ........................ 235/379 |
| 4,672,182 A * | 6/1987 | Hirokawa ................... 235/436 |
| 4,684,791 A * | 8/1987 | Bito ........................... 235/380 |
| 4,723,269 A * | 2/1988 | Summerlin .............. 379/102.04 |
| 4,751,394 A * | 6/1988 | Matsuoka et al. ....... 250/559.29 |
| 4,827,112 A * | 5/1989 | Yoshino et al. ............. 235/380 |
| 4,901,068 A * | 2/1990 | Benton et al. .............. 340/5.65 |
| 5,002,062 A * | 3/1991 | Suzuki ...................... 600/509 |
| 5,146,068 A * | 9/1992 | Ugawa et al. .............. 235/441 |
| 5,286,954 A * | 2/1994 | Sato et al. .................. 235/379 |
| 5,327,497 A * | 7/1994 | Mooney et al. ............ 235/382 |
| 5,408,633 A * | 4/1995 | Katsumura et al. ......... 711/115 |
| 5,410,713 A * | 4/1995 | White et al. ............... 713/330 |
| 5,484,993 A * | 1/1996 | Seto et al. .................. 235/437 |
| 5,534,975 A * | 7/1996 | Stefik et al. .................... 399/1 |
| 5,553,277 A * | 9/1996 | Hirano et al. ............ 707/104.1 |
| 5,832,285 A * | 11/1998 | Shimada .................... 713/323 |
| 5,877,483 A * | 3/1999 | Bilich et al. ............... 235/382 |
| 5,880,444 A * | 3/1999 | Shibata et al. ............. 235/379 |
| 5,911,080 A * | 6/1999 | Yeom ........................ 713/300 |
| 5,956,557 A * | 9/1999 | Kato et al. ................. 399/401 |
| 5,969,630 A * | 10/1999 | Leih et al. .................. 340/7.1 |
| 6,006,335 A * | 12/1999 | Choi et al. ................. 713/310 |
| 6,009,529 A * | 12/1999 | Park .......................... 713/320 |

(Continued)

*Primary Examiner*—Daniel I Walsh
(74) *Attorney, Agent, or Firm*—Staas & Halsey LLP

(57) ABSTRACT

A security monitor apparatus and method using a smart card are provided. The apparatus, which is connected to a system and displays a signal generated by the system, includes an interface that is used to communicate with the smart card containing personal identification information, a detector that detects a signal through the interface to determine insertion of the smart card into the monitor, and a controller that reads the personal identification information via the interface from the smart card and controls turning the display of the monitor on or off, when the insertion of the smart card is detected. The insertion of a smart card containing personal identification information into a monitor apparatus enables immediate screen protection and power savings.

9 Claims, 3 Drawing Sheets

U.S. PATENT DOCUMENTS

| | | | | |
|---|---|---|---|---|
| 6,012,632 A * | 1/2000 | Bouthillier et al. | | 235/375 |
| 6,052,742 A * | 4/2000 | Kirinaka et al. | | 710/10 |
| 6,067,621 A * | 5/2000 | Yu et al. | | 713/172 |
| 6,128,744 A * | 10/2000 | Wang | | 713/300 |
| 6,173,282 B1 | 1/2001 | McCaughan et al. | | 707/9 |
| 6,237,848 B1 * | 5/2001 | Everett | | 235/380 |
| 6,260,111 B1 * | 7/2001 | Craig et al. | | 711/115 |
| 6,325,285 B1 * | 12/2001 | Baratelli | | 235/380 |
| 6,575,373 B1 * | 6/2003 | Nakano | | 235/492 |
| 6,590,597 B1 * | 7/2003 | Kim | | 715/866 |
| 6,670,933 B1 * | 12/2003 | Yamazaki | | 345/1.1 |
| 6,705,520 B1 * | 3/2004 | Pitroda et al. | | 235/382.5 |
| 6,738,901 B1 * | 5/2004 | Boyles et al. | | 713/159 |
| 6,856,353 B1 * | 2/2005 | Misawa | | 348/333.07 |
| 6,993,618 B2 * | 1/2006 | Chen et al. | | 710/305 |
| 7,017,811 B2 * | 3/2006 | Mitchell et al. | | 235/449 |
| 7,059,520 B1 * | 6/2006 | Shtesl | | 235/449 |
| 7,107,455 B1 * | 9/2006 | Merkin | | 713/182 |
| 2001/0002487 A1 * | 5/2001 | Grawrock et al. | | 713/193 |
| 2001/0016502 A1 * | 8/2001 | Shirai | | 455/558 |
| 2001/0034623 A1 * | 10/2001 | Chung | | 705/5 |
| 2001/0035455 A1 * | 11/2001 | Davis et al. | | 235/375 |
| 2001/0045451 A1 * | 11/2001 | Tan et al. | | 235/375 |
| 2002/0013769 A1 * | 1/2002 | Murase | | 705/40 |
| 2002/0016913 A1 * | 2/2002 | Wheeler et al. | | 713/170 |
| 2002/0020752 A1 * | 2/2002 | King | | 235/492 |
| 2002/0029348 A1 * | 3/2002 | Du et al. | | 713/193 |
| 2002/0091586 A1 * | 7/2002 | Wakai et al. | | 705/26 |
| 2002/0139861 A1 * | 10/2002 | Matsumoto et al. | | 235/492 |
| 2002/0178366 A1 * | 11/2002 | Ofir | | 713/182 |
| 2003/0014372 A1 * | 1/2003 | Wheeler et al. | | 705/71 |
| 2003/0051040 A1 * | 3/2003 | Tanikawa et al. | | 709/229 |
| 2003/0055686 A1 * | 3/2003 | Satoh et al. | | 705/3 |
| 2003/0074575 A1 * | 4/2003 | Hoberock et al. | | 713/200 |
| 2003/0088780 A1 * | 5/2003 | Kuo et al. | | 713/185 |
| 2003/0121972 A1 * | 7/2003 | Lee et al. | | 235/380 |
| 2003/0126483 A1 * | 7/2003 | Huang et al. | | 713/310 |
| 2003/0128822 A1 * | 7/2003 | Leivo et al. | | 379/93.02 |
| 2003/0134714 A1 * | 7/2003 | Oishi et al. | | 482/6 |
| 2003/0135727 A1 * | 7/2003 | Challener et al. | | 713/2 |
| 2003/0151600 A1 * | 8/2003 | Takeuchi et al. | | 345/204 |
| 2003/0191960 A1 * | 10/2003 | Hung-yi | | 713/200 |
| 2003/0200445 A1 * | 10/2003 | Park | | 713/185 |
| 2003/0212896 A1 * | 11/2003 | Kisliakov | | 713/193 |
| 2004/0005051 A1 * | 1/2004 | Wheeler et al. | | 380/28 |
| 2004/0060983 A1 * | 4/2004 | Davis et al. | | 235/386 |
| 2004/0104805 A1 * | 6/2004 | Sakamoto et al. | | 340/5.74 |
| 2004/0117308 A1 * | 6/2004 | Bouknight | | 705/44 |
| 2004/0124238 A1 * | 7/2004 | Shimada et al. | | 235/375 |
| 2004/0129776 A1 * | 7/2004 | Choi | | 235/380 |
| 2004/0134992 A1 * | 7/2004 | Guez et al. | | 235/492 |
| 2004/0138921 A1 * | 7/2004 | Broussard et al. | | 705/2 |
| 2004/0139044 A1 * | 7/2004 | Rehwald | | 707/1 |
| 2004/0212735 A1 * | 10/2004 | Kitamura | | 348/553 |
| 2005/0009520 A1 * | 1/2005 | Herrero et al. | | 455/435.1 |
| 2005/0101309 A1 * | 5/2005 | Croome | | 455/418 |
| 2005/0178833 A1 * | 8/2005 | Kisliakov | | 235/441 |
| 2005/0205668 A1 * | 9/2005 | Sogo | | 235/382 |
| 2005/0231467 A1 * | 10/2005 | Gold | | 345/156 |
| 2005/0258244 A1 * | 11/2005 | Mitchell et al. | | 235/449 |
| 2005/0279826 A1 * | 12/2005 | Merrien | | 235/380 |
| 2006/0041402 A1 * | 2/2006 | Baker | | 702/189 |
| 2006/0149977 A1 * | 7/2006 | Cooper | | 713/300 |
| 2006/0152599 A1 * | 7/2006 | Yokonuma et al. | | 348/231.99 |
| 2007/0019018 A1 * | 1/2007 | Wakai | | 347/14 |

* cited by examiner

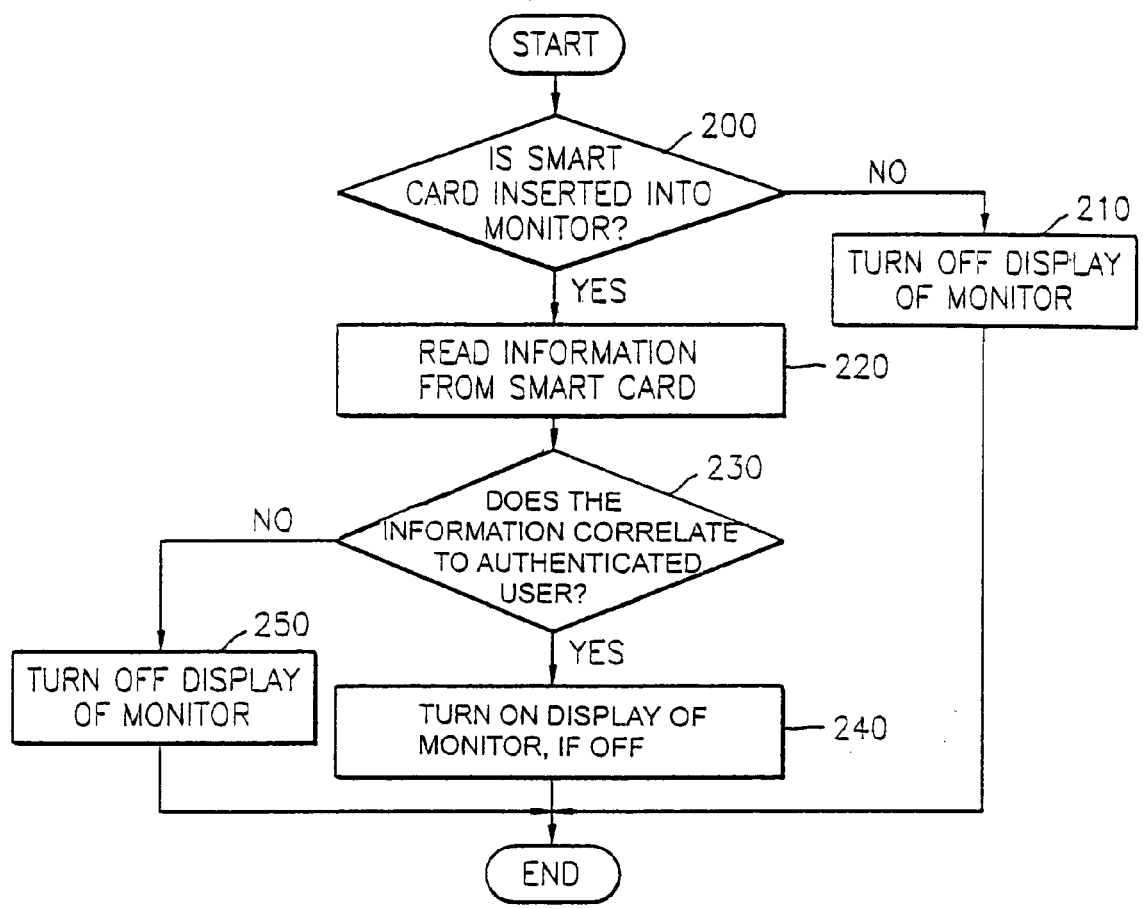
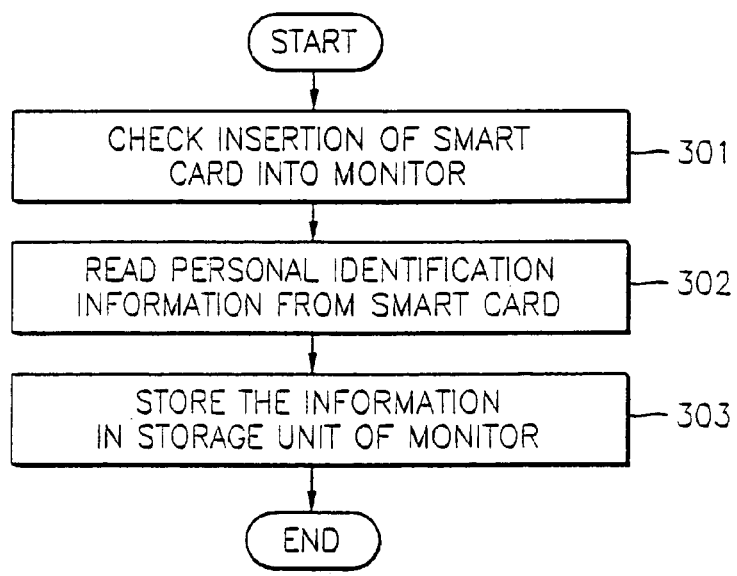

SECURITY MONITOR APPARATUS AND METHOD USING SMART CARD

CROSS-REFERENCE TO RELATED APPLICATION

This application claims the benefit of Korean Patent Application No. 2002-58463, filed on Sep. 26, 2002, in the Korean Intellectual Property Office, the disclosure of which is incorporated herein by reference.

BACKGROUND OF THE INVENTION

1. Field of the Invention

The present invention relates to computer security, and more particularly, to a security monitor apparatus and method using a smart card that contains personal information.

2. Description of the Related Art

As environmental protection and energy savings are matters of major concern, screen protection and energy conservation are becoming increasingly important considerations in a system that includes a monitor. For instance, a screen saver or Display Power Management Signaling (DPMS) is commonly used in a display apparatus, such as a monitor, in order to reduce power consumption.

A power-saving screen saver for a computer monitor changes the current monitor mode to screen protection mode when user input e.g., through a mouse or keyboard is lacking for a predetermined time. While in a screen protection mode, computer activation requires user input or a predetermined password.

DPMS is an international standard focused on achieving a reduction in monitor power consumption. The standard defines four types of power modes corresponding to Advanced Power Management (APM) employed by the main body of a computer. APM is an API developed by INTEL and MICROSOFT allowing power management to be written into the system BIOS. The APM's four types of power modes are an on-mode, a stand-by mode, a suspend mode, and an off-mode. In the on-mode, vertical and horizontal synchronization signals are input from a computer to a display apparatus via a connector. During the on-mode, a video signal is input to the computer and displayed on a screen, operating at full power. In the stand-by mode, only a vertical synchronization signal is input from the computer to the display apparatus via the connector. Nothing is displayed on the screen due to the blanking of the video signal. The screen operates at partial power usage, resulting in little power consumption. In the suspend mode, only a horizontal synchronization signal is input from the computer to the display apparatus via the connector. Once again, nothing is displayed on the screen due to the blanking of the video signal. The screen operates at minimal power usage, resulting in little power consumption. In the off-mode, the power supply is completely shut off, and the vertical and horizontal synchronization signals are not input to the display apparatus. The video signal is blanked, resulting in maximum power savings.

However, the aforementioned screen saver, DPMS-type monitor protection, and energy saving modes unfortunately are not operational until a lack of user input has been detected after a predetermined time. Therefore, actions for monitor protection cannot be immediately taken. Also, once screen saver mode has been set, the existing screen saver mode requires the input of a predetermined password, creating an inconvenience to the user.

SUMMARY OF THE INVENTION

The present invention provides a security monitor apparatus that allows immediate screen protection and power savings using a smart card with personal identification information, and a method using the same.

According to an aspect of the present invention, a system is provided comprising a smart card that contains personal identification information, and a display unit that reads the personal identification information from the smart card and determines whether the display of the display unit will be turned on or off based on the reading result.

According to another aspect of the present invention, a monitor is connected to a system and displays a signal generated by the system. The monitor includes an interface that is used to communicate with the smart card containing personal identification information, a detector that detects a signal through the interface to determine insertion of the smart card into the monitor, and a controller that reads the personal identification information via the interface from the smart card, and controls turning the display of the monitor on or off when the insertion of the smart card is detected.

According to another aspect of the present invention, the controller registers personal identification information stored in the smart card and deletes the registered personal identification information. The monitor may further include a storage unit that stores the personal identification information from the smart card during the registration function. The personal identification information may be deleted from the storage unit. Also, the controller may turn the display of the monitor off when the detector does not recognize the presence of the smart card.

According to yet another aspect of the present invention, a method is provided of turning a display of a monitor on or off that is connected to a system, generating a signal for the monitor to display, using a smart card containing personal identification information. The method includes checking the insertion of the smart card into the monitor, turning the display of the monitor off when the smart card is not inserted into the monitor, reading the personal identification information from the smart card when the smart card is inserted into the monitor, turning the display of the monitor on when the personal identification information relates to an authenticated user, and turning the display of the monitor off when the personal identification information does not relate to the authenticated user.

According to another aspect of the present invention, whether the personal identification information relates to the authenticated user is determined by checking whether information stored in a storage unit of the monitor is the same as the personal identification information stored in the smart card.

According to another aspect of the present invention, the method includes a registration process in which the personal identification information is read from the smart card and stored in the storage unit for the authentication of personal identification information. The method further includes a deletion process in which the information registered to the storage unit is deleted.

According to still another aspect of the present invention, a method is provided of turning a display of a monitor that is connected to a system on or off, and generating a signal for the monitor to display, using a smart card. The method includes registering information stored in the smart card to a storage unit of the monitor, checking the insertion of the smart card into the monitor through a smart card interface on the monitor, and turning the display of the monitor on when the insertion of the smart card is detected and information stored in the smart card is the same as that stored in the storage unit. The method further includes deleting the information from the storage unit of the monitor.

According to still another aspect of the present invention, a monitor is provided that is connected to a system and displays a signal generated by the system. The monitor includes an interface that allows a signal to be input to, and output from, a smart card containing personal identification information, a detector that detects a signal output through the interface, to determine if the smart card is inserted, into or removed, from the monitor. A controller implements an on-screen display (OSD) region on a screen of the monitor and displays into the OSD region registration and deletion buttons of the personal identification information and an authentication result from checking the personal identification information, and turns the display of the monitor on or off based on the authentication result, when the detector determines the insertion of the smart card.

According to another aspect of the present invention, the method includes storing the personal identification information that is read from the smart card during a registration function of the controller. Also, the personal identification information may be deleted from the storage unit during a deleting operation by the controller. The controller turns the display of the monitor off when the detector transmits to the controller a signal indicating that the smart card is removed from the monitor.

Additional aspects and advantages of the invention will be set forth in part in the description which follows and, in part, will be obvious from the description, or may be learned by practice of the invention.

BRIEF DESCRIPTION OF THE DRAWINGS

These features, and/or other aspects and advantages of the invention will become apparent and more readily appreciated from the following description of the embodiments taken in conjunction with accompanying drawings in which:

FIG. 2 is a flowchart illustrating a security monitor method using a smart card according to an aspect of the invention;

FIG. 3A is a flowchart illustrating the registering operation illustrated in FIGS. 1 and 2;

DETAILED DESCRIPTION OF THE INVENTION

Figure 1:
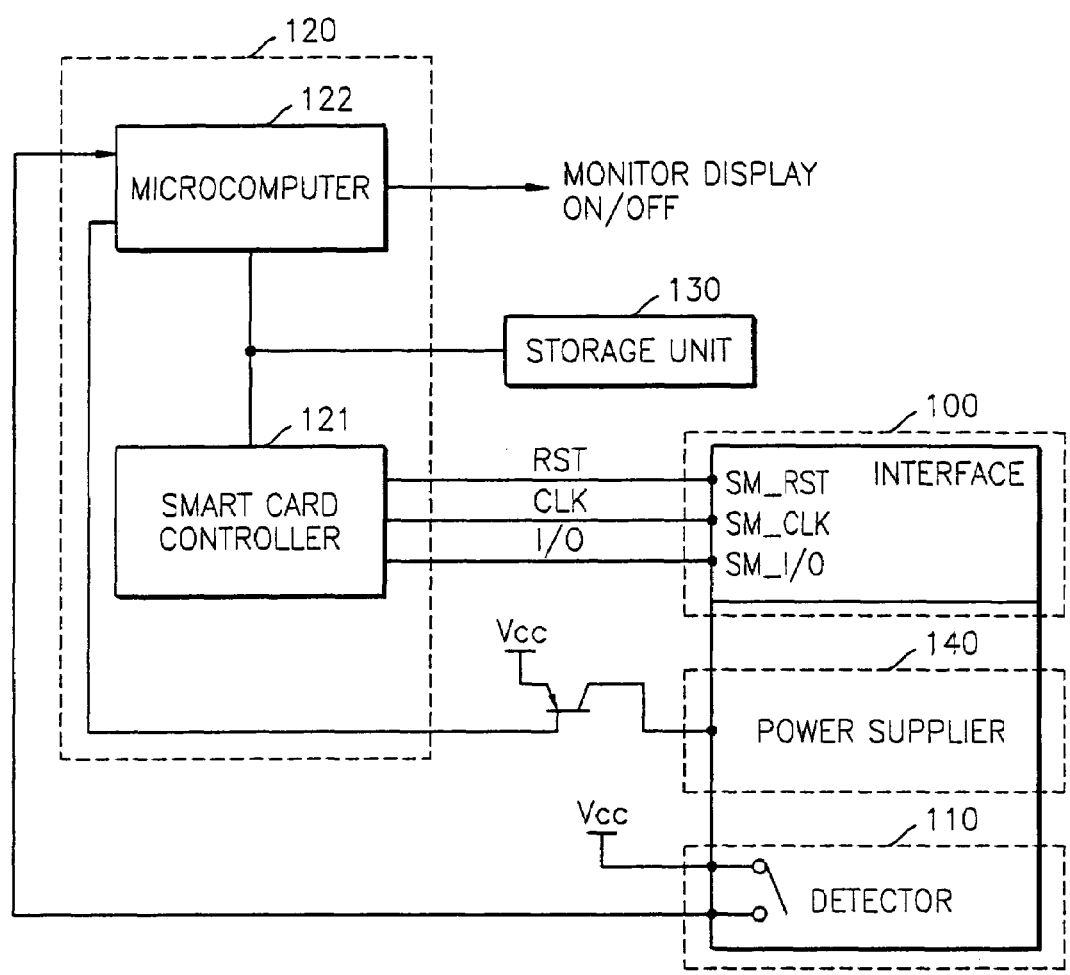
FIG. 1 is a block diagram of a security monitor apparatus using a smart card according to an aspect of the present invention.

Reference will now be made in detail to the embodiments of the present invention, examples of which are illustrated in the accompanying drawings wherein like reference numerals refer to the like elements throughout. The embodiments are described below in order to explain the present invention by referring to the figures.

The present invention provides a monitor apparatus, which recognizes a smart card containing personal identification information and controls activation of the monitor apparatus based on the recognition result.

FIG. 1 is a block diagram of a security monitor apparatus using a smart card according to an aspect of the present invention. For example, a computer monitor is selected as a monitor apparatus.

The monitor of FIG. 1 is connected to a system (not shown) such as a computer and displays a signal generated by the system. The monitor includes an interface 100 allowing information to be input to, and output from, a smart card (not shown) containing personal identification information, and a detector 110 determining insertion of the smart card into the monitor. A controller 120 reads the personal identification information from the smart card via the interface 100 and controls a turning on or off of the display of the monitor based on the read result, when the presence of the smart card is recognized by the detector 110.

The interface 100, which is a smart card holder, includes a smart card connector. An input signal, an output signal, a clock signal, and a reset signal are input to, and output from, the smart card through connection terminals SM_I/O, SM_CLK, and SM_RST of the smart card connector.

The detector 110 circuit outputs different electrical signals, depending on whether the smart card is inserted into or removed from the monitor.

The controller 120 includes a smart card controller 121 and a monitor microcomputer 122. The smart card controller 121 provides a clock signal to the smart card via the connection terminal SM_CLK, i.e. a clock terminal, of the smart card connector on the interface 100, and resets an input/output operation of a signal to/from the smart card using the connection terminal SM_RST, i.e. a reset terminal. Also, the smart card controller 121 reads information, such as the personal identification information, from the smart card via the connection terminal SM_I/O, i.e. an input/output signal terminal, and returns an acknowledge signal ACK to the smart card, acknowledging receipt of a command or a signal.

The monitor microcomputer 122, controlling monitor display, receives an electrical signal from the detector 110, indicating the insertion or removal of the smart card into the monitor. If the electrical signal indicates the insertion of the smart card, the microcomputer 122 has a power supplier 140 provide power to the smart card so that the smart card is charged with electricity, and resulting in the flow of signals in the smart card. When the personal identification information stored in the smart card is output, using the smart card controller 121, to the microcomputer 122, the microcomputer 122 checks whether the information relates to an authenticated user, and controls the display of the monitor based on the checking result. In other words, the microcomputer 122 activates the monitor display when the personal identification information is authenticated, and deactivates the monitor display of the monitor otherwise.

The smart card controller 121 or the microcomputer 122 performs an initial registration process in which the personal identification information is stored in a storage device (or memory) 130 of the smart card using an external input device, such as a keyboard or a mouse, and an on-screen display (OSD) function of the monitor. For instance, when the personal identification information is first read from the smart card and displayed on the monitor, in an OSD state, "confirm" or "cancel" buttons are also displayed so that the user can register or delete the information using one of the "confirm" and "cancel" buttons. If the user selects a registration icon, using the mouse or the keyboard, the personal identification information read from the smart card controller 121 is stored in the storage unit 130. The stored personal identification information is used in determining whether or not information to be read from a smart card in the future is related to an authenticated user. Similarly, a "delete" button can be provided in the OSD allowing a user to delete personal identification information which has already been registered and stored in the storage unit 130.

The controller 120 turns the display of the monitor off when it does not receive a signal from the detector 110 indicating insertion of the smart card. The controller 120 also turns the monitor off, when information read from a smart card through the interface 100 does not match information stored in the storage unit 130.

FIG. 2 is a flowchart illustrating a security monitor method using a smart card, and a controller included in a monitor apparatus. Referring to FIG. 2, the insertion of a smart card into the cardholder installed in a monitor apparatus is checked e.g., by a controller, as shown in operation 200. If the presence of the smart card is not detected after a predetermined time, the controller shuts off the supply of power to the monitor turning the display of the monitor off, in operation 210. If the presence of the smart card is detected, the controller reads personal identification information from the smart card in operation 220. Power is supplied to the smart card, in a security monitor apparatus as shown in FIG. 1, prior to reading the personal identification information from the smart card.

Next in operation 230, the personal identification information read from the smart card is examined for relation to an authenticated user. In other words, the information read from the smart card is compared with information of an authenticated user. The information of an authenticated user may originate from a smart card read for the first time, and stored in the storage unit 130 as explained with respect to the apparatus of FIG. 1. If the information currently being read from the smart card correlates to the information of the authenticated user, the display of the monitor is turned on, if off, in operation 240. Otherwise, the display of the monitor is turned off in operation 250. At this time, a warning may first be displayed on the monitor using an OSD, indicating that information read from the smart card is not related to an authenticated user.

Figure 3B:
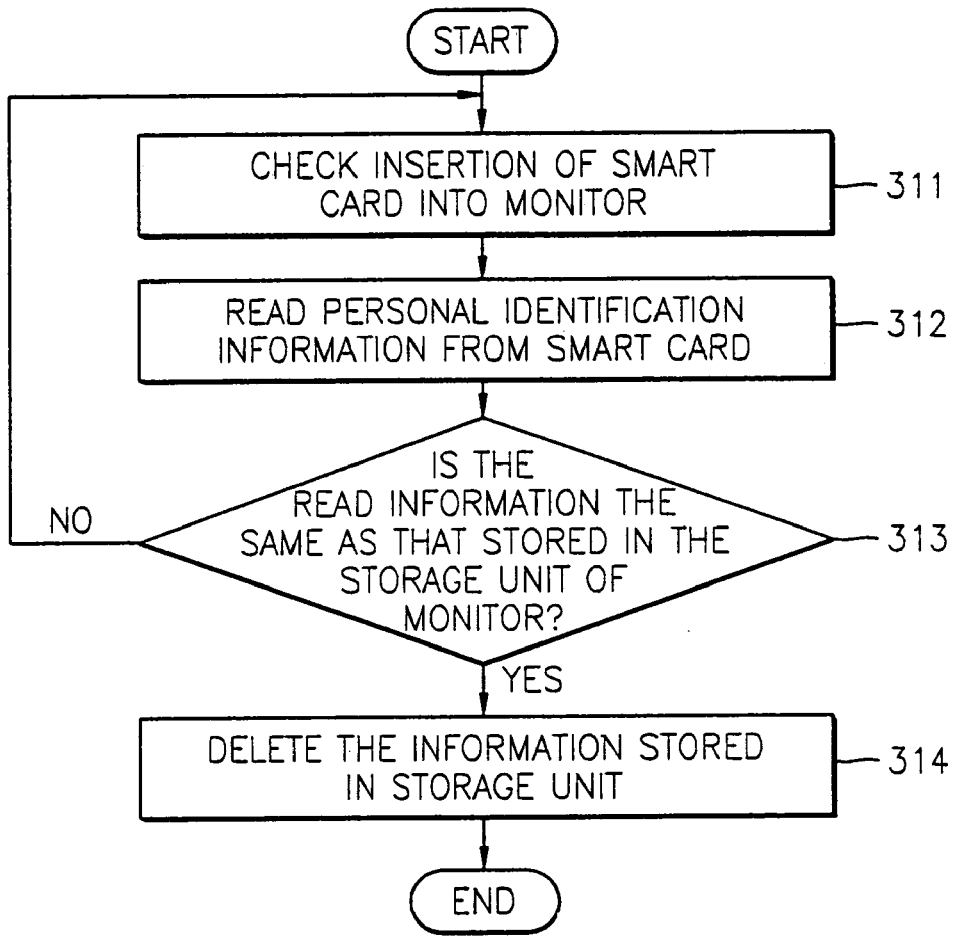
FIG. 3B is a flowchart illustrating the deleting operation illustrated in FIGS. 1 and 2.
Figure 3C:
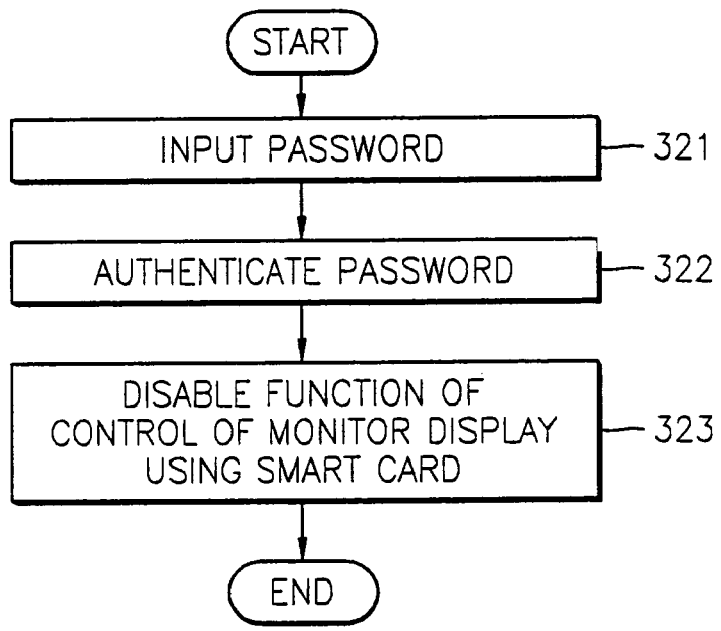
FIG. 3C is a flowchart illustrating a management method that disables the security monitor method according to an aspect of the invention.

FIGS. 3A through 3C are flowcharts illustrating methods of managing a smart card according to aspects of the present invention.

More specifically, FIG. 3A is a flowchart illustrating the registration process described with reference to FIGS. 1 and 2.

Referring to FIG. 3A, the insertion of a smart card into a monitor is checked in operation 301. If the presence of the smart card is detected, personal identification information is read from the smart card in operation 302. The method of FIG. 3A may further include supplying power to the smart card prior to reading the information therefrom, when the presence of the smart card is detected. After reading the information from the smart card, the information is stored e.g., in a storage unit of the monitor in operation 303. The registration process may be automatically performed in the monitor or performed through a user interface by an interaction with a user when information stored in the smart card is read for the first time.

FIG. 3B is a flowchart illustrating the deletion of personal identification information stored in a storage unit, described with reference to the FIGS. 1 and 2. Referring to FIG. 3B, the insertion of a smart card into a monitor is checked in operation 311. If the presence of the smart card is detected, personal identification information is read from the smart card in operation 312. The method of FIG. 3B may also include supplying power to the smart card prior to reading the information therefrom, when the presence of the smart card is detected. After operation 312, it is checked whether the read information is the same as that stored in a storage unit of the monitor in operation 313. If the information of the two are the same, the information stored in the storage unit is deleted in operation 314. Here, the deletion is performed by a user through interaction with a user interface.

FIG. 3C is a flowchart illustrating a management method disabling the monitor security method according to another aspect of the present invention. Referring to FIG. 3C, an OSD, instructing a user to input a predetermined password to be recognized by a monitor, is displayed on the monitor in operation 321. Then, when the user inputs a password, the user input is authenticated in operation 322. If the user input is authenticated, use of the smart card to control the display of the monitor is disabled in operation 323.

As described above, a smart card containing personal identification information is inserted into a monitor apparatus facilitating immediate screen protection and power saving.

According to other aspects of the invention, the smart card controller 121 or the microcomputer 122 is a computer implementing the methods in FIGS. 2, 3A, 3B, and 3C using data encoded on a computer-readable medium.

Although a few embodiments of the present invention have been particularly shown and described, it would be appreciated by those skilled in the art that changes may be made therein in these embodiments without departing from the principles and spirit of the invention, the scope of which is defined in the claims and their equivalents.

What is claimed is:

1. A computer system display capable of showing a display, comprising:
   an interface communicating with a smart card containing personal identification information of a card owner;
   a detector detecting a signal through the interface determining insertion of the smart card into the computer system display; and
   a controller reading the personal identification information via the interface from the smart card, and automatically turning the display of the computer system display on when the insertion of the smart card is detected and the personal identification information stored in the smart card is the same as the personal identification information stored in a storage unit of the computer system display and automatically turning the display of the computer system display off when presence of the smart card is not detected as inserted, wherein the controller registers personal identification information stored in the smart card, compares the registered personal identification information to personal identification information stored in the storage unit of the computer system display, and when the personal identification information stored in the smart card is the same as the personal identification information stored in the storage unit, and provides a delete button in an on screen display (OSD) format for the card owner to select and delete personal identification information from the storage unit of the computer system display.

2. The computer system display according to claim 1, wherein the controller further comprises:
   a smart card controller, and
   a display microcomputer.

3. The computer system display according to claim 2, wherein the smart card controller provides clock signals to the smart card via a connection terminal, and the smart card controller resets signals sent to, and signals output from, the smart card via a reset terminal.

4. The computer system display of claim 1, wherein the controller turns the display of the computer system display off when the detector does not recognize the presence of the smart card, after a predetermined time.

5. A method of turning a display of a computer system display on and off, the computer system display connected to a system, the method comprising:

registering personal identification information of a card carrier stored in a smart card into a storage unit of the computer system display;

checking the insertion of the smart card into the computer system display through a smart card interface of the computer system display;

automatically turning the display of the computer system display on when the insertion of the smart card is detected and personal identification information of a card carrier stored in the smart card is the same as the personal identification information stored in the storage unit;

automatically turning the display of the computer system display off when the presence of the smart card is not detected as inserted; and when the personal identificaton information stored in the smart card is the same as the registered personal information stored in the storage unit of the computer system display, providing a delete button in an on screen display (OSD) format for the card owner to select and delete personal identification information from the storage unit of the computer system display.

6. A computer system display connected to a system, the computer system display comprising:

an interface allowing a signal to be input to, and output from, a smart card containing personal identification information of a card owner;

a detector detecting a signal output through the interface, and determining if the smart card is inserted into, or removed from the computer system display; and a controller implementing an on-screen display (OSD) region on a display of the computer system display displaying registration and deletion buttons and an authentication result from checking the registered personal identification information, activation of the registration buttons storing the personal identification information of the card owner in a storage unit of the computer display system, the deletion buttons being displayed when the personal identification information of the smart card is the same as that stored in the storage unit and activation of the deletion buttons deleting the personal identification from the storage unit, and wherein the display of the computer system display is automatically turned on when insertion of the smart card is detected and the authentication result is that the personal identification information stored in the smart card is the same as the personal identification information stored in the storage unit, and wherein the display of the computer system display is automatically turned off when the authentication result is that the presence of the smart card is detected as not inserted.

7. The computer system display of claim 6, wherein the controller turns off the display of the computer system display when the detector transmits to the controller a signal indicating that the smart card is removed from the computer system display.

8. The computer system display of claim 6, wherein the computer system display displays a warning using the OSD region based upon the authentication result when the personal identification information does not relate to an authenticated user, and the display of the computer system display turns off based upon the authentication result.

9. A method of managing information, comprising:

detecting insertion of a smart card containing personal identification information of a card owner into a computer system display apparatus by a detecting circuit, the detecting circuit being part of a computer system display that is capable of showing an on-screen display (OSD) on a display of the computer system display;

supplying power to the detected smart card through the detection circuit;

electronically reading information stored within the smart card;

electronically comparing the read information with personal identification information stored in a storage unit of the computer system display; and when a result from comparing indicates the information stored in the storage unit is the same as the read information, automatically turning the display of the computer system display on and deleting the information in the storage unit.

* * * * *

UNITED STATES PATENT AND TRADEMARK OFFICE
CERTIFICATE OF CORRECTION

PATENT NO. : 7,392,941 B2  Page 1 of 1
APPLICATION NO. : 10/670772
DATED : July 1, 2008
INVENTOR(S) : Young-hun Choi It is certified that error appears in the above-identified patent and that said Letters Patent is hereby corrected as shown below:

Column 7, Line 16 Claim 5, change "identificaton" to --identification--.

Column 8, Line 26 Claim 9, change "of a" to --of--.

Signed and Sealed this

Fourth Day of November, 2008

JON W. DUDAS
*Director of the United States Patent and Trademark Office*